United States Patent
Likic et al.

(10) Patent No.: US 12,068,770 B2
(45) Date of Patent: Aug. 20, 2024

(54) ACTIVATION OF VEHICLE CHARGING DEVICES FROM VEHICLE INTEGRATED CONTROLLER

(71) Applicant: GENTEX CORPORATION, Zeeland, MI (US)

(72) Inventors: Sinisa Likic, Hudsonville, MI (US); Christian Schubert, Schandelah (DE); Klaus Weibler, Ohrigen (DE)

(73) Assignee: GENTEX CORPORATION, Zeeland, MI (US)

( * ) Notice: Subject to any disclaimer, the term of this patent is extended or adjusted under 35 U.S.C. 154(b) by 311 days.

(21) Appl. No.: 17/497,194

(22) Filed: Oct. 8, 2021

(65) Prior Publication Data

US 2022/0116067 A1 Apr. 14, 2022

Related U.S. Application Data

(60) Provisional application No. 63/089,558, filed on Oct. 9, 2020.

(51) Int. Cl.
*H04B 1/3822* (2015.01)
*G06F 3/01* (2006.01)
*G08C 17/02* (2006.01)
*H02J 7/00* (2006.01)

(52) U.S. Cl.
CPC ............ *H04B 1/3822* (2013.01); *G06F 3/01* (2013.01); *G08C 17/02* (2013.01); *G08C 2201/30* (2013.01)

(58) Field of Classification Search
CPC ......... H04B 1/3822; G06F 3/01; G08C 17/02; G08C 2201/30; H02J 7/00
See application file for complete search history.

(56) References Cited

U.S. PATENT DOCUMENTS

| | | | |
|---|---|---|---|
| 9,875,650 B2 * | 1/2018 | Witkowski | G07C 5/0808 |
| 10,093,194 B2 * | 10/2018 | Hyde | B60L 53/39 |
| 10,106,045 B2 | 10/2018 | Beattie, Jr. et al. | |
| 10,850,634 B2 * | 12/2020 | Wang | H02J 50/10 |
| 2012/0330494 A1 * | 12/2012 | Hendrix | B60L 53/66 701/29.3 |
| 2017/0106760 A1 | 4/2017 | Wang et al. | |
| 2018/0062420 A1 | 3/2018 | Isaac | |

(Continued)

FOREIGN PATENT DOCUMENTS

| | | |
|---|---|---|
| EP | 3248828 A1 | 11/2017 |
| WO | 2013010592 A1 | 1/2013 |

OTHER PUBLICATIONS

International Search Report dated Jan. 13, 2022, for corresponding PCT application No. PCT/US2021/054151, 3 pages.

(Continued)

*Primary Examiner* — Blane J Jackson
(74) *Attorney, Agent, or Firm* — Price Heneveld LLP; Brian James Brewer

(57) ABSTRACT

A trainable transceiver comprises a transceiver circuit, a user interface, and a control circuit in selective communication with the transceiver circuit. The control circuit is further in communication with and configured to process inputs received at the user interface. The transceiver circuit is configured to, in response to a particular input received at the user interface, transmit an activation signal to a vehicle charging station.

19 Claims, 3 Drawing Sheets

(56) References Cited

U.S. PATENT DOCUMENTS

2019/0176637 A1  6/2019  Booth et al.
2020/0122601 A1  4/2020  Nelson

OTHER PUBLICATIONS

Written Opinion dated Jan. 13, 2022, for corresponding PCT application No. PCT/US2021/054151, 5 pages.
International Preliminary Report on Patentability dated Mar. 28, 2023, for corresponding PCT application No. PCT/US2021/054151, 6 pages.

* cited by examiner

ACTIVATION OF VEHICLE CHARGING DEVICES FROM VEHICLE INTEGRATED CONTROLLER

CROSS REFERENCE TO RELATED APPLICATIONS

This application claims the benefit of and priority to U.S. Provisional Patent Application No. 63/089,558, filed on Oct. 9, 2020, entitled Activation of vehicle charging devices from vehicle integrated controller, the entire disclosure of which is hereby incorporated herein by reference.

FIELD OF THE DISCLOSURE

This disclosure relates generally to the activation of a remote device, and in particular, to the activation of a remote device from an in-vehicle controller.

BACKGROUND

Electric vehicles are becoming more common as people seek vehicles that may be cheaper to run, cheaper to maintain, less damaging to the environment, or for other reasons. Generally electric vehicles run on rechargeable batteries. However, the batteries in electric vehicles must periodically be charged.

Charging batteries in an electric vehicle may involve connecting the vehicle to a charging station and activating the charging station. Many charging stations require a user to use a physical key or a key card to activate the charging stations. This requires the user to carry the key or key card. If the key or key card is lost, the vehicle cannot be charged. This may prevent the user from driving the vehicle.

As electric vehicles become more common, charging stations for electric vehicles are also becoming more common. They may be located in public places, in semi-private garages used by a limited number of users such as garages associated with apartment or condominium buildings, and in private garages such as those associated with private homes. The charging stations in some private parking garages used by a limited number of users may be intended for the use of, for example, only those drivers who have paid to access the charging stations. A key or key card may be required to activate the charging station. This prevents unauthorized use of the charging station.

SUMMARY

According to an aspect, a trainable transceiver may comprise a transceiver circuit; a user interface; and a control circuit in selective communication with the transceiver circuit, and in communication with and configured to process inputs received at the user interface. The transceiver circuit may be configured to, in response to an appropriate input received at the user interface, transmit an activation signal to a charging station. The control circuit may comprise a processor and a memory; and the memory may be in communication with the processor. The memory may include stored data on appropriate inputs. An RFID tag may be configured to be in selective communication with an RFID reader.

The user interface may comprise at least one user input element; and the at least one user input element may comprise at least one of buttons, levers, switches, soft keys, microphones, sensors, a global positioning system, and a remote electronic device. The control circuit may be configured to prevent the transmission of the activation signal until the vehicle is connected to the charging station. The control circuit may be configured to, in response to a second appropriate input, cause the transmission of a second activation signal to a second charging station. The second appropriate input may be different from the first appropriate input. The transceiver circuit may be configured to selectively transmit signals corresponding to inputs received. The transceiver circuit may be configured to receive status or other information to be conveyed to a user The trainable transceiver is associated with a rearview assembly of a vehicle.

A method of activating a charging station may comprise: receiving an input at a user interface of a trainable transceiver; receiving, by a control circuit, data associated with the received input; comparing, by the control circuit, the received data with stored data; determining whether the received data is associated with an appropriate input; and transmitting, by a transceiver circuit, an activation signal to the charging station. The trainable transceiver may be associated with a vehicle. The control circuit may be configured to determine whether confirmation that the vehicle is connected to the charging station has been received. The charging station may begin the charging of the vehicle upon receipt of the activation signal.

DETAILED DESCRIPTION

Figure 1:
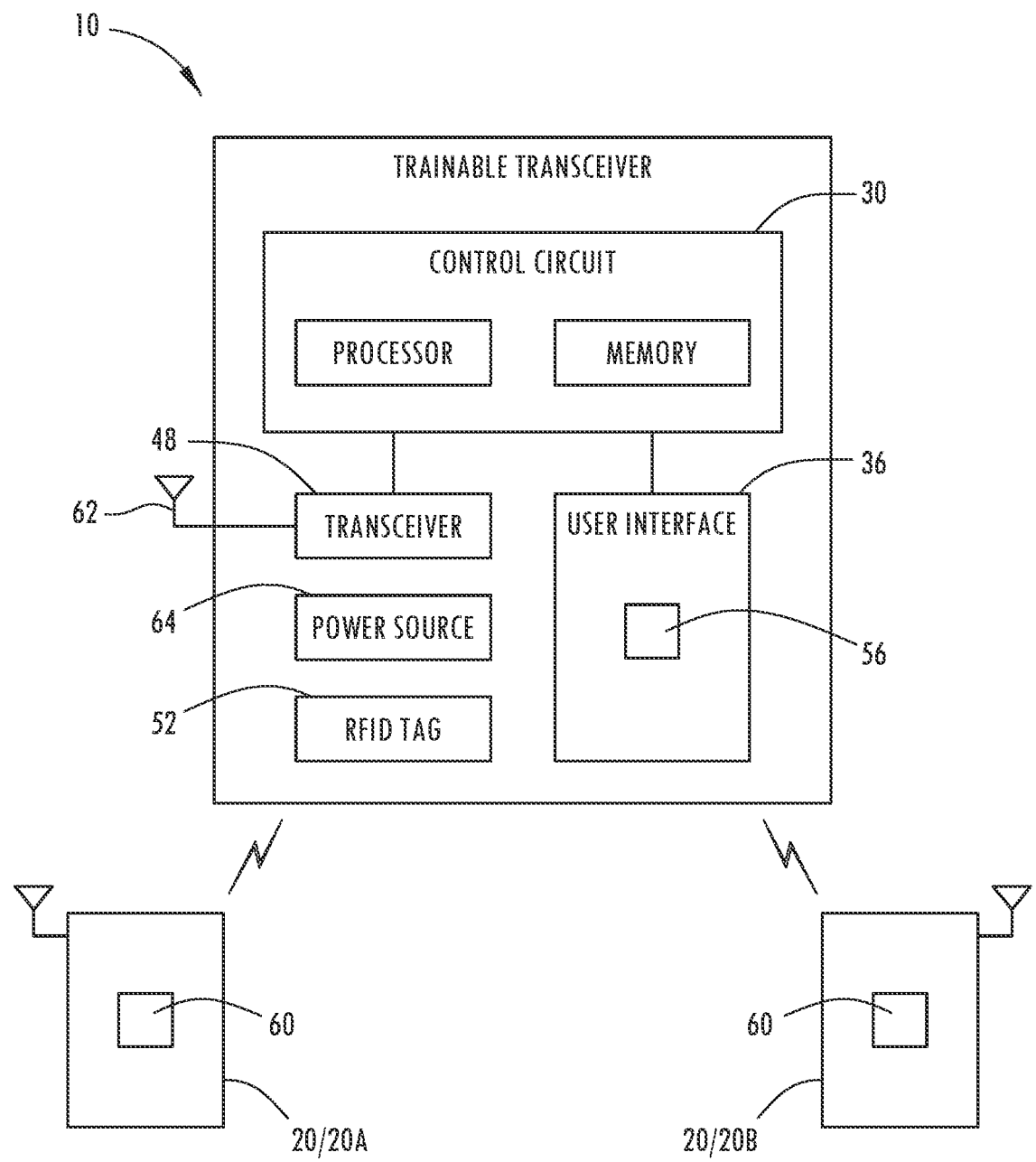
FIG. 1 illustrates a block diagram of a system for activating a charging device in accordance with this disclosure.

Referring to FIG. 1, a trainable transceiver, shown generally at 10, may be disposed in a vehicle (not shown). Trainable transceiver 10 may be configured to allow a user to remotely activate a remote charging device 20 such as a vehicle charging station, shown in FIG. 2. Trainable transceiver 10 may comprise a control circuit 30, and a user interface 36 configured to receive user inputs. Control circuit 30 may comprise a processor 40, and user interface 36 may be in communication with processor 40. Processor 40 may be disposed on a printed circuit board 42. Control circuit 30 may further comprise memory 44. Memory 44 may be in communication with processor 40. Trainable transceiver 10 may further comprise a transceiver circuit 48. In some embodiments, trainable transceiver 10 may further comprise a radio frequency identification (RFID) tag 52.

Transceiver circuit 48 may be in selective communication with control circuit 30. Transceiver circuit 48 may be configured to, in response to an input received at user interface 36, transmit an activation signal to remote charging device 20 (hereinafter referred to as charging station).

User interface 36 may be configured to be in selective electrical communication with control circuit 30. User interface 36 may comprise one or more input elements 56 such as buttons, levers, switches, soft keys, microphones, sensors such as fingerprint sensors or motion sensors, and the like. Control circuit 30 may be configured to process inputs received at user interface 36.

In some embodiments, the one or more input elements 56 of user interface 36 may comprise, for example, a motion sensor in communication with processor 40. The one or more input elements 56 may be configured to receive inputs based on a user's gestures. Data on a particular gesture may be stored in memory 44 and may be compared, by control circuit 30, with data on gestures sensed by motion sensor. Once a user has performed a particular gesture, if control circuit 30 determines that the data from the perceived gesture matches data on a stored gesture, processor 40 may determine that an appropriate input has been received.

In another example, the one or more input elements 56 of user interface 36 may comprise a fingerprint sensor. User interface 36 may be configured to, upon the receipt of a fingerprint, communicate to processor 40 that a fingerprint has been received. Data from previously enrolled fingerprints may be stored in memory 44. Processor 40 may be configured to compare data from the received fingerprint with data from a previously-enrolled fingerprint to determine whether the received fingerprint matches the previously enrolled fingerprint. If processor 40 determines that the received fingerprint matches a previously-enrolled fingerprint, processor 40 may determine that an appropriate input has been received.

In some embodiments, user interface may additionally, or alternatively, comprise one or more imagers (not shown). Data from a face or iris of a previously enrolled user may be stored in memory 44. Imager(s) may be configured to capture images such as images of a user's face or iris. Processor 40 may be configured to compare data from the received image with data from the face of iris of a previously-enrolled user to determine whether the received image matches the previously enrolled image. If processor 40 determines that the received data matches data from a previously-enrolled user, processor 40 may determine that an appropriate input has been received.

In another example, the one or more input elements 56 of user interface 36 may be voice activated and may comprise a microphone 54 in communication with processor 40. Processor 40 may be configured to compare data from a received voice command with data from a voice command stored in memory 44. Upon the receipt of a specific command through microphone 54, processor 40 may determine that an appropriate input has been received. In some embodiments, processor 40 may be configured to determine whether data from a user's voice matches data from a previously-stored user voice. If the voices are determined to be a match and the user issues an appropriate command, processor 40 may determine that an appropriate input has been received.

In another example, the one or more input elements 56 of user interface 36 may comprise a global positioning system or other system configured to determine the location of the vehicle. Data on a predetermined location may be stored in memory 44. Upon the vehicle reaching the predetermined location, processor 40 may determine that an appropriate input has been received. In some embodiments, the vehicle may be required to remain in the predetermined location for a predetermined period of time prior to processor 40 determining that the appropriate input has been received.

In another example, an input may be received from a remote electronic device (not shown) such as a smartphone, a computer, or a tablet computer. A user may access an application on the remote electronic device in order to cause the transmission of an activation signal. The application may have a dedicated user interface 36 that allows a user to interact with trainable transceiver 10. For example, the application may be HomeLink Connect®. The user may cause the application to generate and transmit an input to trainable transceiver 10. Upon receipt of the input, processor 40 may determine that an appropriate input has been received.

In another example, the one or more input elements 56 may include elements such as buttons, levers, switches, or soft keys. In some embodiments, the one or more input elements 56 associated with activating charging station 20 may also be associated with other functions of trainable transceiver 10, and may be operable to cause trainable transceiver 10 to perform other functions. For example, a single input element 56 may be dedicated to activating charging station 20. In another example, activating a plurality of input elements 56, either simultaneously or in a predetermined sequence, may cause the activation of charging station 20. Once a user has activated the appropriate input element(s) 56, charging station 20 may determine that an appropriate input has been received.

In some embodiments, user interface 36 may be located remotely from one or more other components of trainable transceiver 10. User interface 36 may be located within the cabin of the vehicle, and one or more other components of trainable transceiver 10 may be located in other locations (e.g., in an engine bay, in a trunk, behind or within a dashboard, in a headliner, elsewhere in the cabin, and/or in other locations). User interface 36 may be configured to communicate via wire or wirelessly with the remaining components of trainable transceiver 10. In some embodiments, user interface 36 may be disposed on a remote electronic device. Communication between user interface 36 and other components of trainable transceiver 10 may be carried out using one or more wireless communication protocols (e.g., a Bluetooth protocol, WiFi protocol, ZigBee protocol, or other protocol).

Upon the receipt of an appropriate input at the user interface 36, trainable transceiver 10 may initiate the process of activating charging station 20. User interface 36 may communicate with control circuit 30. Control circuit 30 may be configured to cause the generation of an activation signal that may cause the activation of charging station 20. Activation signals may be wired or wireless signals transmitted to charging station 20. Transceiver circuit 48 may be configured to transmit the activation signal to charging station 20 once the activation signal has been generated. Upon receipt of the activation signal, charging station 20 may be activated. If the vehicle is connected to charging station 20, upon being activated charging station 20 may be begin charging the vehicle.

Charging station 20 may be configured to ascertain that the vehicle is connected to charging station 20 prior to charging the vehicle. In some embodiments, the activation signal may be transmitted after the vehicle has been connected to charging station 20. Once the activation signal has been received by charging station 20, charging station 20 may begin charging the vehicle. In some embodiments, the activation signal may be transmitted prior to the vehicle being connected to charging station 20. Charging station 20 will not begin charging the vehicle until both the activation signal has been received and the vehicle has been connected to charging station 20.

Transceiver circuit 48 may comprise a wireless transceiver (e.g., WiFi transceiver, radio frequency transceiver, Bluetooth transceiver, optical transceiver, and/or other transceiver) configured to communicate with charging station 20. Transceiver circuit 48 may be in communication with user interface 36 and with control circuit 30. In some embodiments, transceiver circuit 48 may be in communication with one or more antennae 62 to facilitate the transmission and receipt of signals such as activation signals. In some embodiments, trainable transceiver 10 may comprise more than one antenna 62, for example, at least two of an antenna for sub-GHz frequencies, an antenna for frequencies >GHz such as 2.4 GHz for BT, and an antenna to be used as a separate receive antenna. In some embodiments, at least one antenna 62 may be placed on or secured to a printed circuit board (not shown) of trainable transceiver 10.

In some embodiments, transceiver circuit 48 may be configured to selectively transmit signals corresponding to inputs received and/or to receive status or other information to be conveyed to a user. For example, transceiver circuit 48 may be configured to transmit or to cause the display of an indication when an activation signal is transmitted to charging station 20. In another example, once charging station 20 has been activated, a second indication may be transmitted or displayed to the user.

The signals may include, for example, indications that a vehicle is being charged, that a vehicle has finished charging, that a vehicle has stopped being charged, that charging station 20 is locked. In some embodiments, the signals may include an indication that the vehicle has been unplugged. This may alert a vehicle user that someone has unplugged their vehicle.

In some embodiments, transceiver circuit 48 may transmit and/or receive information (e.g., activation signals, control signals, control data, status information, or other information) using a radio frequency signal. For example, transceiver circuit 48 may transmit and/or receive radio frequency signals in the ultra-high frequency range, typically between 260 and 960 megahertz (MHz), although other frequencies may be used.

In some embodiments, trainable transceiver 10 may comprise a radio frequency identification (RFID) tag and charging station 20 may have an RFI reader 60. RFI reader 60 may be configured to send radio waves to RFID tag 52 and to convert waves sent from RFID tag 52 back into data. RFI reader 60 may further be configured to analyze the data from RFID tag 52 to determine whether RFID tag 52 is linked to an authorized user of charging station. In some embodiments, upon the receipt of an appropriate input at user interface 36, RFI reader 60 may be activated and may determine the presence of RFID tag 52. In some embodiments, upon the receipt of an appropriate input at user interface 36, RFID tag 52 may be activated and may be detectable by RFI reader 60. Upon confirmation of the presence of RFID tag 52, the charging station 20 may be activated. In some embodiments, RFID tag 52 may be capable of transmitting a signal a significant distance, for example, at least 5 feet, at least 10 feet, at least 20 feet.

In some embodiments, trainable transceiver 10 may transmit signals using radio frequency (RF) or Bluetooth®. The transmitted signal may allow a user to access charging station 20 to charge the vehicle.

In some embodiments, trainable transceiver may be configured to send a secure code to charging station 20. The secure code may be given or may be embedded in software, or may be taken from, for example, a mobile communications device such as a smart phone. The secure code may allow charging station 20 to identify vehicle and to begin charging vehicle, along with communicating with user.

In order to be charged, vehicle must be connected to charging station 20. Vehicle may be connected to charging station 20 by a wired connection or wirelessly. Vehicle may be connected to charging station 20 either prior to the transmission of the activation signal or after the transmission. Charging of the vehicle will not begin until both the vehicle is connected to charging station 20 and the activation signal for the charging station 20 has been received.

In some embodiments, trainable transceiver 10 may be capable of generating an activation signal for a first charging station 20A and a second charging station 20B. For example, a user may charge a vehicle both at home and at work. User interface 36 may be configured to accept a first input and a second input. The receipt of first input at user interface 36 may cause control circuit 30 to generate a first activation signal corresponding to first charging station 20A. Once first activation signal has been generated, transceiver circuit 48 may transmit first activation signal to first charging station 20A. The receipt of second input at user interface 36 may cause control circuit 30 to cause the generation of a second activation signal corresponding to second charging station 20B. Once second activation signal has been generated, transceiver circuit 48 may transmit second activation signal to second charging station 20B.

Control circuit 30 may include various types of control circuitry, digital and/or analog, and may include a microprocessor, microcontroller, application-specific integrated circuit (ASIC), graphics processing unit (GPU), or other circuitry configured to perform various input/output, control, analysis, and other functions to be described herein. In some embodiments, control circuit 30 may function as a controller for transceiver circuit 48 or other communication device (e.g., implement a Bluetooth communications protocol). Control circuit 30 may be configured to receive inputs from user interface 36. In response to the receipt of inputs from user interface 36, control circuit 30 may cause transceiver circuit 48 to transmit an activation signal, control signal, and/or other signal. Control circuit 30 may use information in memory 44 to cause transceiver circuit 48 to format the activation signal.

Memory 44 may be volatile and/or non-volatile memory. Memory 44 may be random access memory, read only memory, flash memory, hard disk storage, flash memory storage, solid state drive memory, and the like.

In some embodiments, a power source 64 may also be included in trainable transceiver 10. In one embodiment, power source 64 may be or may include a vehicle power system. Power source 64 may be a vehicle power system including a battery, alternator or generator, power regulating equipment, and/or other electrical power equipment. In further embodiments, power source 64 may include components such as a battery, capacitor, solar cell, and/or other power generation or storage equipment.

Trainable transceiver 10 may be associated with a rearview assembly 68. In some embodiments, the components of trainable transceiver 10 may be located within or mounted upon a housing 72 of rearview assembly 68. In some embodiments, some components of trainable transceiver 10 may be located within or mounted upon housing 72, while other components of trainable transceiver 10 may be located elsewhere.

Figure 2:
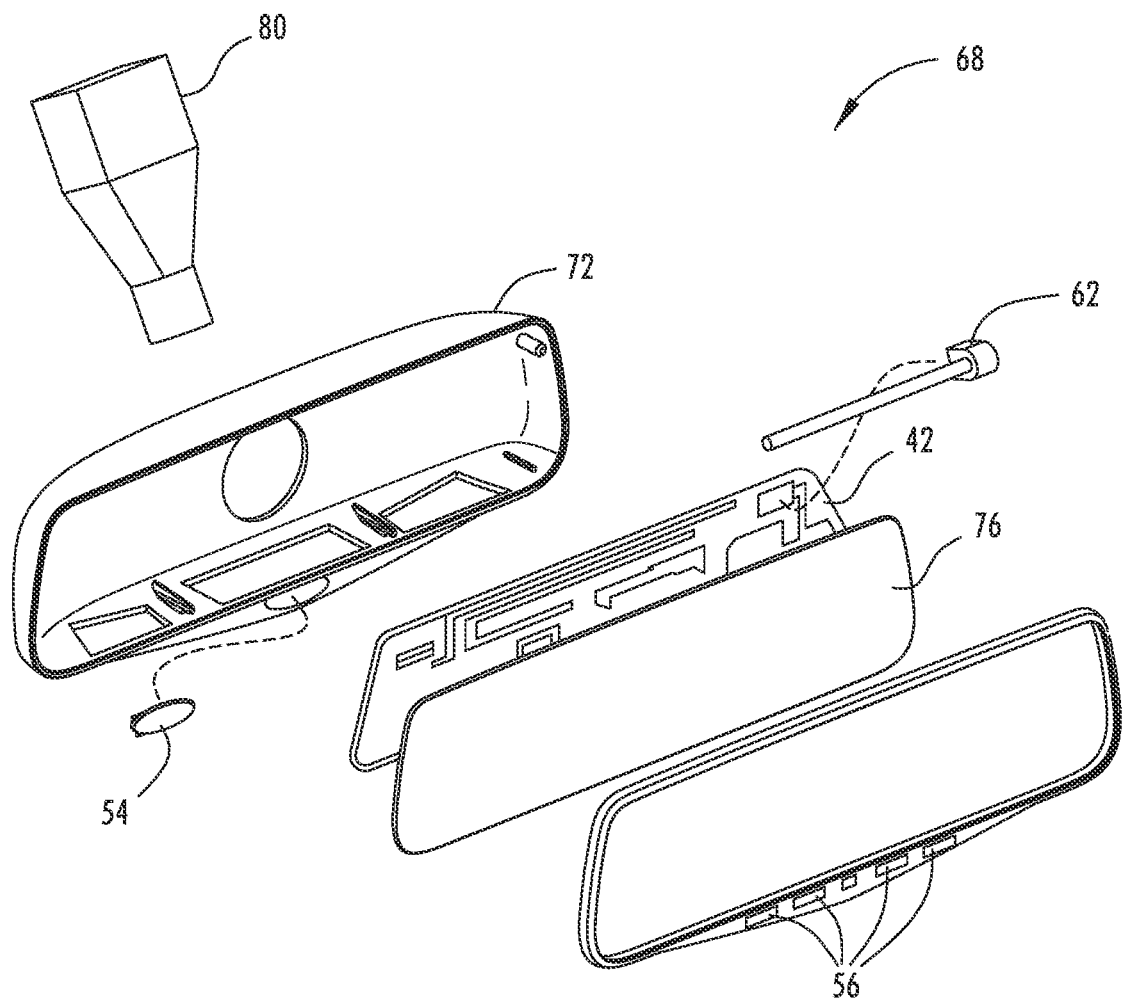
FIG. 2 illustrates an exploded view of an embodiment of a trainable transceiver in accordance with this disclosure.

An example of a rearview assembly 68 constructed in accordance with one embodiment of the present disclosure is shown in FIG. 2. Rearview assembly 68 may comprise a housing 72 and a rearview device 76 such as a mirror element, a rearview display, or both, at least partially disposed in housing 72. Rearview assembly 68 may be disposed in an interior of the vehicle, and may be mounted to a windshield or to a roof of the vehicle. Rearview assembly 68 may be mounted to vehicle with a mounting arm 80. Although each of the elements of trainable transceiver 10 may be housed within rearview assembly 68, some or all of the components may be provided in other remote locations and transmit and receive information over a vehicle bus (not shown) or via RF transmissions. Alternatively, although shown as incorporated in a rearview assembly 68 of the vehicle, trainable transceiver 10 may instead be incorporated into various other vehicle accessories or locations within the vehicle.

Figure 3:
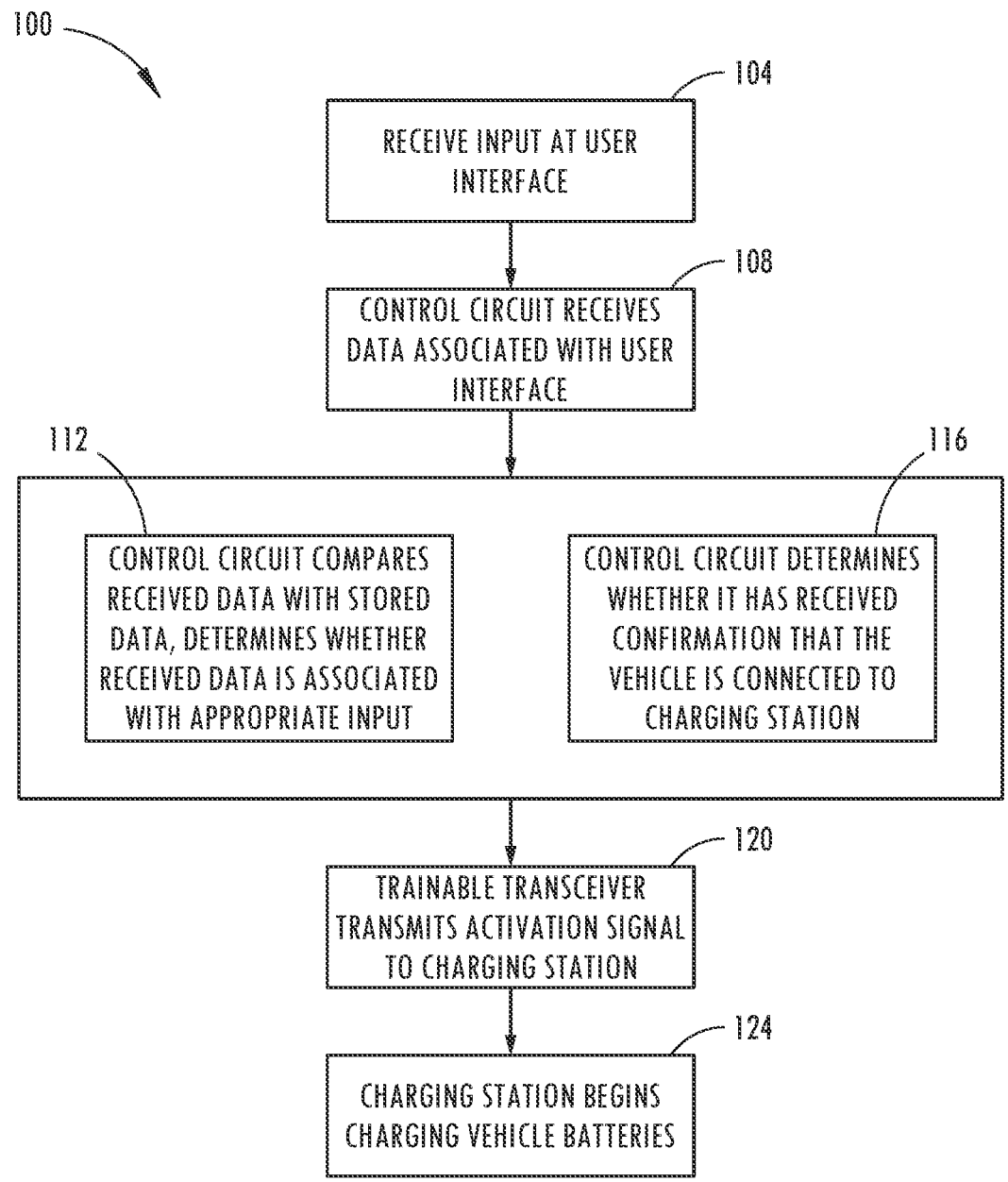
FIG. 3 is a flow chart illustrating a method of activating a charging station using the trainable transceiver in accordance with this disclosure.

As shown in FIG. 3, a method 100 of activating a charging station 20 may comprise receiving, at user interface 36, an input in step 104. In step 108, control circuit 30 may receive data associated with the user input at user interface 36. In step 112, control circuit 30 may compare the received data with data stored in memory 44 and determines whether the data from the received input is associated with an appropriate input. In step 116, control circuit 30 may determine whether it has received confirmation that the vehicle is connected to charging station. In step 120, upon a determination that the data is associated with an appropriate input, trainable transceiver may transmit an activation signal to charging station. In step 124, upon receipt of the activation signal and if the vehicle is connected to charging station, charging station may begin charging the vehicle batteries.

As used herein, a "rearview assembly" is a structure that may provide an image of a scene to the rear of a driver. Rearview assembly may additionally or alternatively include an electronic display that displays an image as sensed by a rearward facing camera or other imaging system (see, for example, commonly assigned U.S. Pat. No. 6,550,949 entitled "SYSTEMS AND COMPONENTS FOR ENHANCING REAR VISION FROM A VEHICLE," filed on Sep. 15, 1998, by Frederick T. Bauer et al., the entire disclosure of which is incorporated herein by reference). Additionally or alternatively, rearview assembly may include both an electro-optic rearview assembly and a display device for providing an image from a rearward facing camera or other imaging system. Thus, a "rearview assembly" need not include a mirror element. In the embodiments described below, a rearview assembly is shown and described.

The above description is considered that of the preferred embodiments only. Modifications of the disclosure will occur to those skilled in the art and to those who make or use the disclosure. Therefore, it is understood that the embodiments shown in the drawings and described above are merely for illustrative purposes and not intended to limit the scope of the disclosure, which is defined by the following claims as interpreted according to the principles of patent law, including the doctrine of equivalents. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

In this document, relational terms, such as first and second, top and bottom, front and back, left and right, vertical, horizontal, and the like, are used solely to distinguish one entity or action from another entity or action, without necessarily requiring or implying any actual such relationship, order, or number of such entities or actions. These terms are not meant to limit the element which they describe, as the various elements may be oriented differently in various applications. Furthermore, it is to be understood that the device may assume various orientations and step sequences, except where expressly specified to the contrary. It is also to be understood that the specific devices and processes illustrated in the attached drawings and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

It will be understood that any described processes or steps within described processes may be combined with other disclosed processes or steps to form structures within the scope of the present disclosure. The exemplary processes disclosed herein are for illustrative purposes and are not to be construed as limiting. It is also to be understood that variations and modifications can be made on the aforementioned methods without departing from the concepts of the present disclosure, and further it is to be understood that such concepts are intended to be covered by the following claims unless these claims by their language expressly state otherwise.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within at least one of 2% of each other, 5% of each other, and 10% of each other.

The invention claimed is:

1. A trainable transceiver, comprising:
   a transceiver circuit;
   a user interface including at least one user input element that includes a global positioning system configured to determine the location of a vehicle; and
   a control circuit in selective communication with the transceiver circuit, and in communication with and configured to process inputs received at the user interface;
   wherein the transceiver circuit is configured to, in response to the vehicle reaching the predetermined location, determining that a first appropriate input received at the user interface, transmit an activation signal to a vehicle charging station, and transmit a first indication to a user that the activation signal has been transmitted to the vehicle charging station.

2. The trainable transceiver of claim 1, wherein the control circuit comprises a processor and a memory; and wherein the memory is in communication with the processor.

3. The trainable transceiver of claim 2, wherein the memory has stored data on appropriate inputs.

4. The trainable transceiver of claim 1, further comprising an RFID tag that is linked to an authorized user and configured to, upon the receipt of the appropriate input, be in selective communication with an RFID reader.

5. The trainable transceiver of claim 1, wherein the at least one user input element further comprises at least one of buttons, levers, switches, soft keys, microphones, sensors, and a remote electronic device.

6. The trainable transceiver of claim 1, wherein the control circuit is configured to prevent the transmission of the activation signal until both the first appropriate input has been received at the user interface and the vehicle is connected to the charging station.

7. The trainable transceiver of claim 1, wherein the control circuit is configured to, in response to a second appropriate input, cause the transmission of a second activation signal to a second charging station.

8. The trainable transceiver of claim 7, wherein the second appropriate input is different from the first appropriate input.

9. The trainable transceiver of claim 1, wherein the transceiver circuit is configured to selectively transmit signals corresponding to inputs received.

10. The trainable transceiver of claim 1, wherein the transceiver circuit is configured to receive status or other information to be conveyed to a user.

11. The trainable transceiver of claim 1, wherein the trainable transceiver is associated with a rearview assembly of a vehicle.

12. A method of activating a charging station, comprising:
receiving an input at a user interface of a trainable transceiver;
receiving, by a control circuit, data associated with the received input;
comparing, by the control circuit, the received data with stored data;
determining whether the received data is associated with an appropriate input, wherein a vehicle is required to remain in the predetermined location for a predetermined period of time prior to the control circuit determining that the received data associated with the appropriate input has been received;
transmitting, by a transceiver circuit, an activation signal to the charging station; and
charging an associated vehicle with the charging station, only after the activation signal has been received by the charging station.

13. The method of claim 12, wherein the trainable transceiver is associated with a vehicle; and
further comprising determining, by the control circuit, whether confirmation that the vehicle is connected to the charging station has been received.

14. The method of claim 12, further comprising commencing the charging, by the charging station, of the vehicle upon receipt of the activation signal.

15. The method of claim 12, further comprising, in response to a second appropriate input that is different than the appropriate input, cause the transmission of a second activation signal to a second charging station.

16. The trainable transceiver of claim 1, wherein the vehicle is required to remain in the predetermined location for a predetermined period of time prior to the control circuit determining that the appropriate input has been received.

17. The trainable transceiver of claim 1, further including a power source that includes a battery and a solar cell.

18. The trainable transceiver of claim 1, wherein the at least one user input element includes a fingerprint sensor configured to, upon the receipt of a fingerprint, communicate to the control circuit that the fingerprint has been received; and
the control circuit is further configured to compare data from the received fingerprint with data from a previously-enrolled fingerprint.

19. The trainable transceiver of claim 1, wherein the transceiver circuit is further configured to transmit a second indication to a user once the vehicle charging station has been activated.

* * * * *